(12) United States Patent
Li et al.

(10) Patent No.: US 10,203,791 B2
(45) Date of Patent: Feb. 12, 2019

(54) DISPLAY SUBSTRATE, TOUCH PANEL AND DISPLAY PANEL, AND FABRICATING METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jun Li, Beijing (CN); Jiayao Shi, Beijing (CN); Zhao Dong, Beijing (CN); Tsungchieh Kuo, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/564,884

(22) PCT Filed: Nov. 15, 2016

(86) PCT No.: PCT/CN2016/105826
§ 371 (c)(1),
(2) Date: Oct. 6, 2017

(87) PCT Pub. No.: WO2018/090165
PCT Pub. Date: May 24, 2018

(65) Prior Publication Data
US 2018/0307354 A1    Oct. 25, 2018

(51) Int. Cl.
*H05K 1/00*    (2006.01)
*G06F 3/041*    (2006.01)
(Continued)

(52) U.S. Cl.
CPC .......... *G06F 3/0412* (2013.01); *G06F 1/1643* (2013.01); *G06F 3/047* (2013.01)

(58) Field of Classification Search
CPC .. H05K 1/00; H05K 1/16; H05K 3/02; H05K 3/30; H05K 3/36; H05K 3/40; H05K 3/46;
(Continued)

(56) References Cited

FOREIGN PATENT DOCUMENTS

| CN | 1577023 A | 2/2005 |
|---|---|---|
| CN | 101840080 A | 9/2010 |

(Continued)

OTHER PUBLICATIONS

International Search Report & Written Opinion dated Aug. 15, 2017, regarding PCT/CN2016/105826.

*Primary Examiner* — Xiaoliang Chen
(74) *Attorney, Agent, or Firm* — Intellectual Valley Law, P.C.

(57) ABSTRACT

The present application discloses a display substrate having a first area for bonding a driver integrated circuit. The display substrate includes a base substrate; an overcoat layer on the base substrate in a second area of the display substrate; the overcoat layer having an interface portion in an area abutting the first area, the interface portion having a plurality of teeth and a plurality of slits, two adjacent teeth being spaced apart by a slit; and a conductive line layer on a side of the overcoat layer proximal to the base substrate, having a plurality of conductive lines extending from the second area to the first area; each of the plurality of conductive lines electrically connected to a signal line in the second area.

11 Claims, 12 Drawing Sheets

(51) Int. Cl.
*G06F 1/16* (2006.01)
*G06F 3/047* (2006.01)

(58) Field of Classification Search
CPC ......... H01L 21/02; H01L 21/56; H01L 21/70;
H01L 23/12; H01L 23/13; H01L 23/48;
H01L 23/60
USPC ......... 174/250; 438/107, 108, 689; 348/108;
349/150; 257/286, 434, 686
See application file for complete search history.

(56) References Cited

FOREIGN PATENT DOCUMENTS

| | | |
|---|---|---|
| CN | 202522820 U | 11/2012 |
| CN | 203376696 U | 1/2014 |
| CN | 104182107 A | 12/2014 |
| JP | 2012064027 A | 3/2012 |

DISPLAY SUBSTRATE, TOUCH PANEL AND DISPLAY PANEL, AND FABRICATING METHOD THEREOF

CROSS-REFERENCE TO RELATED APPLICATION

This application is a national stage application under 35 U.S.C. § 371 of International Application No. PCT/CN2016/105826 filed Nov. 15, 2016, the contents of which are incorporated by reference in the entirety.

TECHNICAL FIELD

The present invention relates to display technology, more particularly, to a display substrate, a touch panel and a display panel having the same, and a fabricating method thereof.

BACKGROUND

In conventional display apparatuses, the driver integrated circuit is typically mounted on a printed circuit board on the back of the display apparatuses. The addition of the driver integrated circuit and the printed circuit board significantly increases the thickness of the display apparatuses.

Chip-on-glass mounting methods have become a focus of research and development in recent years. In a chip-on-glass type display apparatus, the driver integrated circuit is directly mounted on an overlapping edge of a substrate of the display apparatus, resulting in a much thinner display apparatus. In addition, the connections between the driver integrated circuit and the display apparatus may be completely hidden inside the display apparatus, and isolated from the external environment. Typically, the driver integrated circuit in a chip-on-glass type display apparatus is mounted to the display substrate using an anisotropic conductive film.

SUMMARY

In one aspect, the present invention provides a display substrate having a first area for bonding a driver integrated circuit, comprising a base substrate; an overcoat layer on the base substrate in a second area of the display substrate, the overcoat layer comprising an interface portion in an area abutting the first area, the interface portion having a plurality of teeth and a plurality of slits, two adjacent teeth being spaced apart by a slit; and a conductive line layer on a side of the overcoat layer proximal to the base substrate, comprising a plurality of conductive lines extending from the second area to the first area; each of the plurality of conductive lines electrically connected to a signal line in the second area; each of the plurality of conductive lines comprising a first portion in the first area and a second portion in the second area; a projection of the second portion substantially covered by a projection of a corresponding tooth in plan view of the display substrate; the first portion being configured to be electrically connected to a driver integrated circuit in the first area.

Optionally, a portion of the corresponding tooth having a minimum width is wider than the second portion on both sides of the second portion along a width direction of the second portion.

In another aspect, the present invention provides a touch panel comprising a display substrate described herein, wherein the signal line is a touch electrode signal line.

Optionally, the touch panel further comprises a touch driver integrated circuit; and an anisotropic conductive film comprising a plurality of conductive beads; wherein the touch driver integrated circuit is mounted in the first area by the anisotropic conductive film.

Optionally, the touch panel in the second area comprises a touch electrode layer on the base substrate; an insulating layer on a side of the touch electrode layer distal to the base substrate; a touch electrode signal line layer on a side of the insulating layer distal to the touch electrode layer, and the overcoat layer on a side of the touch electrode signal line layer distal to the insulating layer.

Optionally, the touch panel is a one-glass-solution touch panel.

Optionally, the touch panel further comprises a black matrix layer on a side of the conductive line layer proximal to the base substrate.

In another aspect, the present invention provides a method of fabricating a display substrate having a first area for bonding a driver integrated circuit; comprising forming a conductive line layer comprising a plurality of conductive lines on a base substrate; and forming an overcoat layer on a side of the conductive line layer distal to the base substrate in a second area of the display substrate; the overcoat layer being formed to have an interface portion in an area abutting the first area, the interface portion having a plurality of teeth and a plurality of slits, two adjacent teeth spaced apart by a slit; wherein the plurality of conductive lines are formed to extend from the second area to the first area; each of the plurality of conductive lines is formed to comprise a first portion in the first area and a second portion in the second area; a projection of the second portion substantially covered by a projection of a corresponding tooth in plan view of the display substrate; the first portion is configured to be electrically connected to a driver integrated circuit in the first area.

Optionally, the corresponding tooth is formed so that a portion of the corresponding tooth having a minimum width is wider than the second portion on both sides of the second portion along a width direction of the second portion.

Optionally, the step of forming the overcoat layer comprises forming an overcoat material layer on a side of the conductive line layer distal to the base substrate; and patterning the overcoat material layer with a mask plate thereby forming the interface portion having the plurality of teeth and the plurality of slits.

Optionally, prior to forming the overcoat layer, the method further comprises forming a signal line layer comprising a plurality of signal lines in the second area on the base substrate; the signal line layer being on a side of the overcoat layer proximal to the base substrate; each of the plurality of signal lines electrically connected to a corresponding conductive line in the second area.

In another aspect, the present invention provides a method of fabricating a touch panel having a first area for bonding a driver integrated circuit, comprising forming a touch electrode layer on a base substrate; forming an insulating layer on a side of the touch electrode layer distal to the base substrate; forming a conductive line layer comprising a plurality of conductive lines on a side of the insulating layer distal to the touch electrode layer; and forming an overcoat layer on a side of the conductive line layer distal to the insulating layer in a second area of the touch panel; the overcoat layer being formed to have an interface portion in an area abutting the first area, the interface portion having a plurality of teeth and a plurality of slits, two adjacent teeth spaced apart by a slit; wherein the plurality of conductive lines are formed to extend from the second area to the first area; each of the plurality of conductive lines is formed to comprise a first portion in the first area and a second portion in the second area; a projection of the second portion substantially covered by a projection of a corresponding tooth in plan view of the touch panel; the first portion is configured to be electrically connected to a touch driver integrated circuit in the first area.

Optionally, the corresponding tooth is formed so that a portion of the corresponding tooth having a minimum width is wider than the second portion on both sides of the second portion along a width direction of the second portion.

Optionally, prior to forming the overcoat layer, the method further comprises forming a touch electrode signal line layer comprising a plurality of touch electrode signal lines in the second area on a side of the insulating layer distal to the touch electrode layer, the touch electrode signal line layer being on a side of the overcoat layer proximal to the base substrate; each of the plurality of conductive lines electrically connected to a touch electrode signal line in the second area.

Optionally, the method further comprises mounting a touch driver integrated circuit in the first area using an anisotropic conductive film comprising a plurality of conductive beads.

Optionally, the method further comprises forming a black matrix layer on a side of the conductive line layer proximal to the base substrate.

In another aspect, the present invention provides a display panel comprising a display substrate described herein or fabricated by a method described herein.

Optionally, the display panel further comprises the driver integrated circuit; and an anisotropic conductive film comprising a plurality of conductive beads; wherein the driver integrated circuit is mounted in the first area by the anisotropic conductive film.

In another aspect, the present invention provides a display apparatus comprising a display panel described herein.

In another aspect, the present invention provides a display apparatus comprising a touch panel described herein or fabricated by a method described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1:
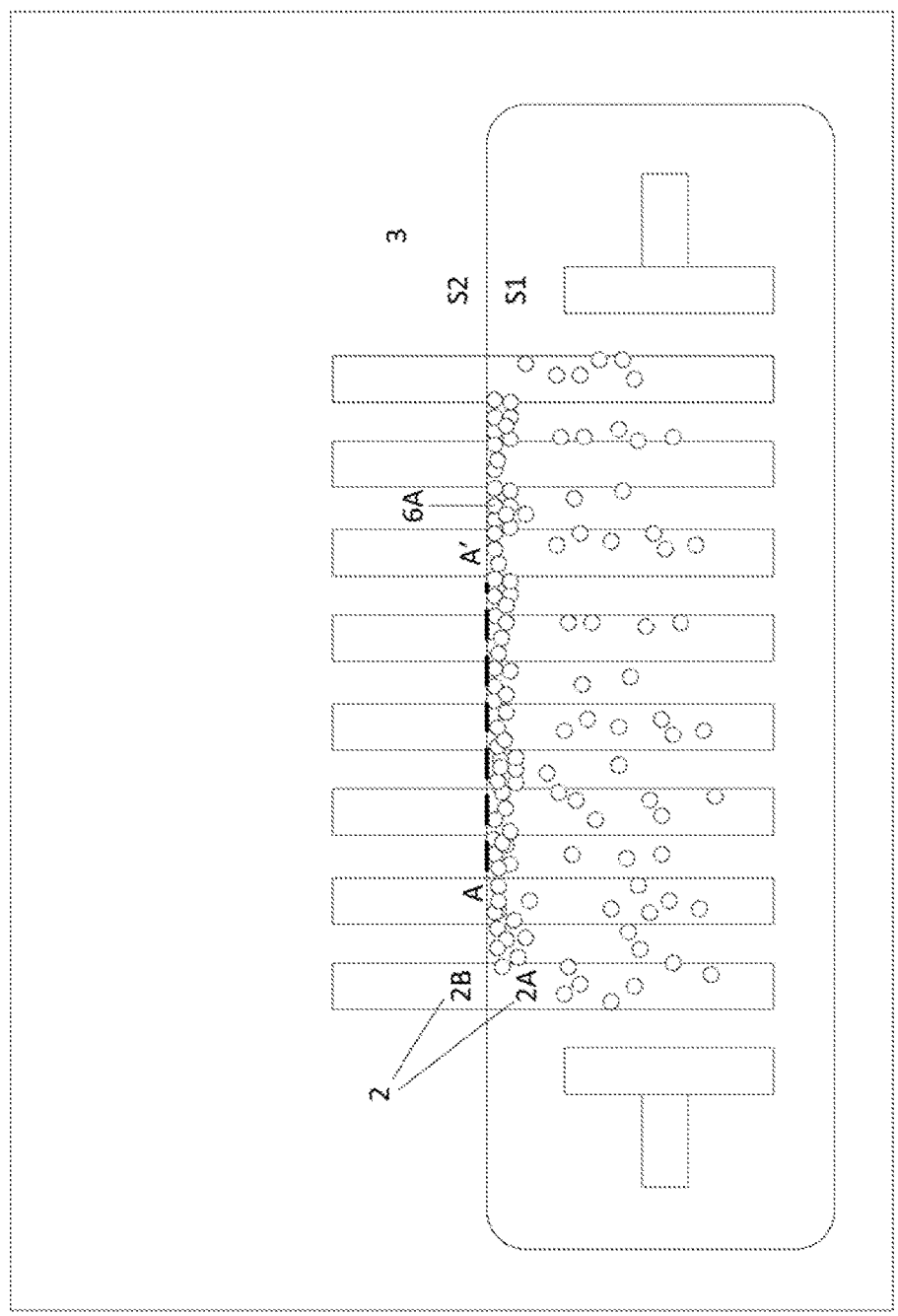
FIG. 1 is a diagram illustrating the structure of a conventional display substrate.
Figure 2:
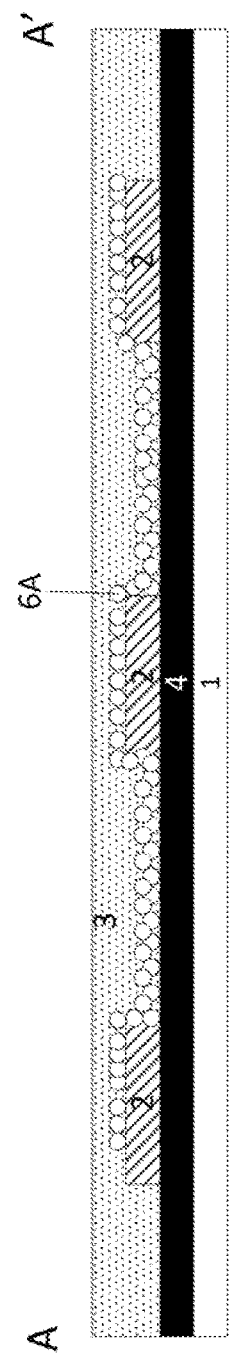
FIG. 2 is a cross-section view along the A-A' line in FIG. 1.

FIG. 1 is a diagram illustrating the structure of a conventional display substrate. FIG. 2 is a cross-section view along the A-A' line in FIG. 1. Referring to FIGS. 1 and 2, the conventional display substrate includes a base substrate 1, a conductive line layer including a plurality of conductive lines 2 on the base substrate 1, and an overcoat layer 3 on a side of the conductive line layer distal to the base substrate 1. The conventional display substrate includes a first area S1 and a second area S2. The first area S1 is a bonding area where a driver integrated circuit bonds to the conventional display substrate. The second area S2 is the remaining area of the display substrate (e.g., the area corresponding to the overcoat layer 3).

In a chip-on-film process, the driver integrated circuit is bonded to the display substrate using an anisotropic conductive film (not explicitly shown in FIG. 1 or FIG. 2) having a plurality of conductive beads 6A to ensure electrical contact between the driver integrated circuit and the conductive lines 2. In bonding the driver integrated circuit to the display substrate, a pressure is applied to the driver integrated circuit and the anisotropic conductive film to adhere the driver integrated circuit to the display substrate. As shown in FIGS. 1 and 2, the conductive beads 6A in the anisotropic conductive film tend to accumulate at the interface between the first area S1 and the second area S2. In the process of forming the overcoat layer 3, an overcoat material layer is formed on the base substrate 1, and the overcoat material layer is subsequently removed in the first area S1, creating a step structure at the interface between the first area S1 and the second area S2. When the pressure is applied to adhere the driver integrated circuit to the display substrate, excess conductive beads 6A are drawn to the step structure, accumulating at the interface between the first area S1 and the second area S2. When the density of accumulated conductive beads 6A reaches a certain level, adjacent conductive lines 2 may be electrically connected by the accumulated conductive beads 6A. As a result, short circuit occurs between adjacent conductive lines 2.

Accordingly, the present invention provides a display substrate, a touch panel and a display panel having the same, and a fabricating method thereof that at least partially obviate one or more of the problems due to limitations and disadvantages of the related art. In one aspect, the present invention provides a display substrate having a first area for bonding a driver integrated circuit. In some embodiments, the display substrate includes a base substrate; an overcoat layer on the base substrate in a second area of the display substrate; and a conductive line layer on a side of the overcoat layer proximal to the base substrate. The overcoat layer has an interface portion in an area abutting the first area. The interface portion has a plurality of teeth and a plurality of slits, each of the plurality of slits spacing apart two adjacent teeth. The conductive line layer includes a plurality of conductive lines extending from the second area to the first area. Each of the plurality of conductive lines is electrically connected to a signal line in the second area. Each of the plurality of conductive lines has a first portion in the first area and a second portion in the second area. A projection of the second portion substantially covered by a projection of a tooth of the overcoat layer in plan view of the display substrate. The first portion is configured to be electrically connected to a driver integrated circuit in the first area, e.g., in a display panel having the present display substrate and a driver integrated circuit.

Figure 3:
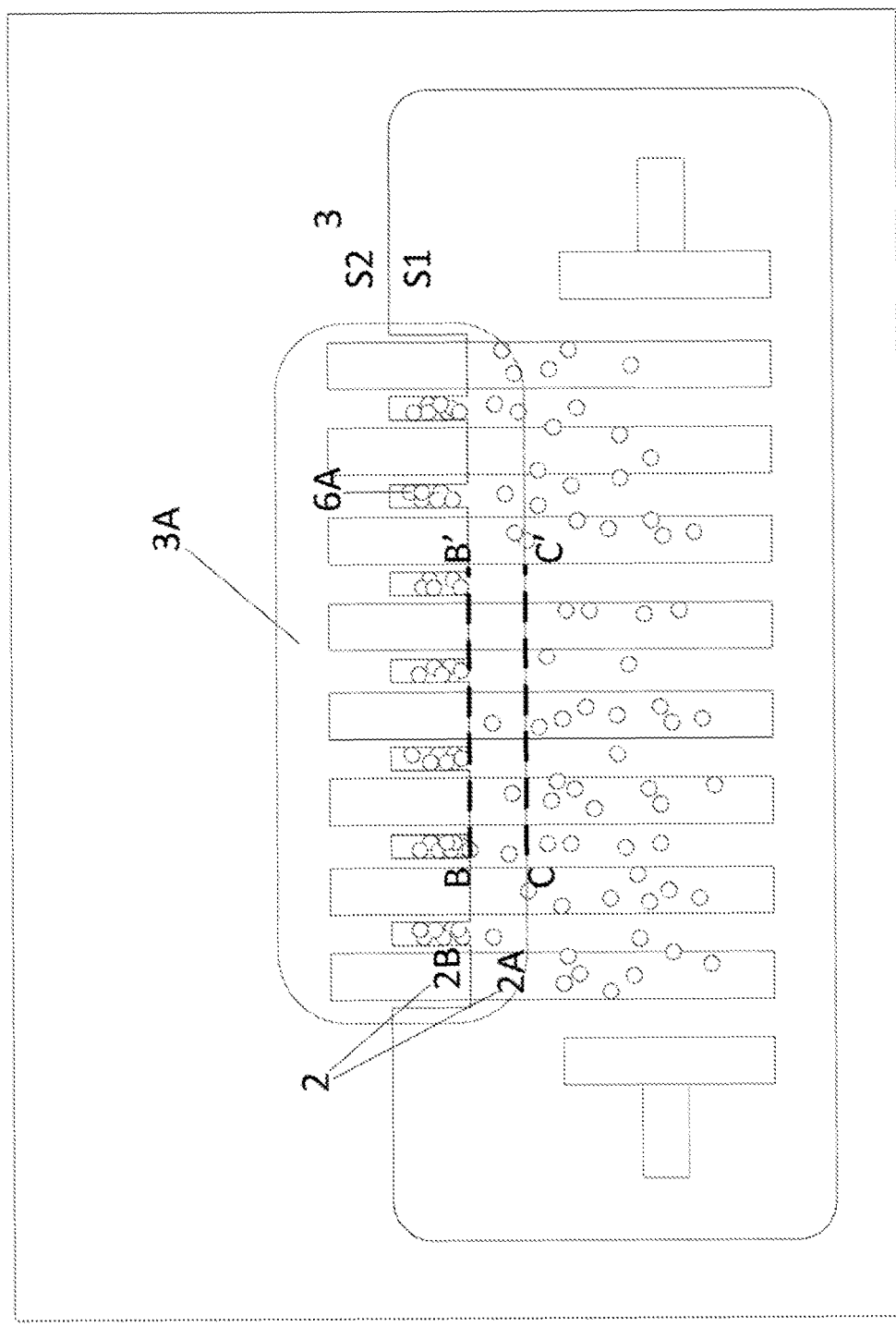
FIG. 3 is a diagram illustrating the structure of a display substrate in some embodiments.
Figure 4:
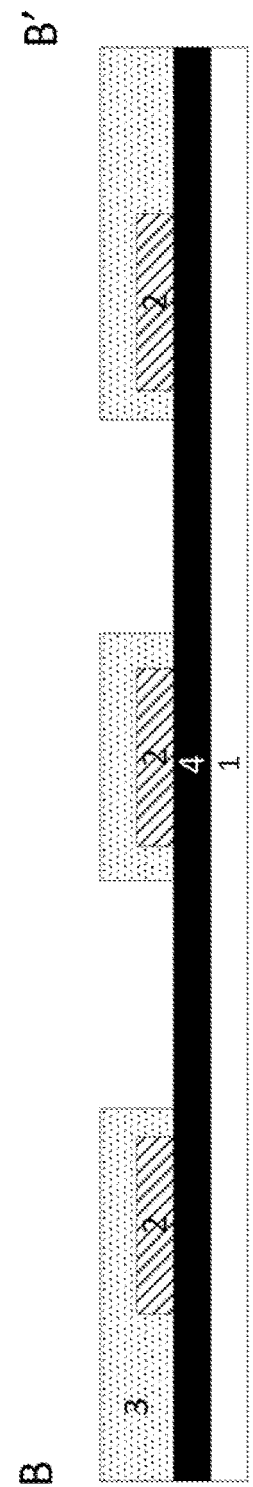
FIG. 4 is a cross-sectional view along the B-B' line in FIG. 3.

FIG. 3 is a diagram illustrating the structure of a display substrate in some embodiments. FIG. 4 is a cross-sectional view along the B-B' line in FIG. 3. Referring to FIGS. 3 and 4, the display substrate in the embodiment includes a base substrate 1, a conductive line layer including a plurality of conductive lines 2 on the base substrate 1, and an overcoat layer 3 on a side of the conductive line layer distal to the base substrate 1. The display substrate in the embodiment includes a first area S1 and a second area S2. The first area S1 is a bonding area where a driver integrated circuit bonds to the display substrate. The second area S2 is the remaining area of the display substrate, e.g., an area corresponding to the overcoat layer 3. For example, the overcoat layer 3 may be formed by depositing an overcoat material layer on the base substrate 1, e.g., on a side of the conductive line layer distal to the base substrate 1. Subsequently, a portion of the overcoat material layer is removed to expose the plurality of conductive lines 2 for bonding to a driver integrated circuit. The removed portion of the overcoat material layer is corresponds to the first area S1. The remaining portion of the overcoat material layer corresponds to the second area S2.

Referring to FIG. 3, the plurality of conductive lines 2 extend from the second area S2 to the first area S1 (i.e., a driver integrated circuit bonding area). Each of the conductive lines 2 is electrically connected to a signal line (not shown in FIG. 3) in the second area S2. Each of the conductive lines 2 is configured to be electrically connected to a driver integrated circuit (not shown in FIG. 2) in the first area S1, e.g., in a display panel having the present display substrate. The first area S1 (e.g., the driver integrated circuit bonding area) is in a peripheral area of the display substrate. Optionally, the second area S2 include a display area and a portion of the peripheral area (e.g., the portion of the peripheral area outside of the first area S1). Depending on the design, the plurality of conductive lines 2 may optionally extend from the display area to the driver integrated circuit bonding area. Optionally, the plurality of conductive lines 2 extend from the portion of the peripheral area outside of the first area S1 to the driver integrated circuit bonding area. As defined herein, the term "display area" refers to a region on the display panel on which an image is displayed. Optionally, a display area is an area across which pixels, each being a unit of display, are arranged in a matrix pattern. For example, a display area is a region surrounded by a line connecting outermost pixels (pixels are basic units for displaying an image) to each other in plan view of the display panel A peripheral area is an area in the display substrate other than the display area.

Various appropriate signal lines and corresponding driver integrated circuits may be used in the present display substrate. Examples of appropriate signal lines include, but are not limited to, touch electrode signal lines, gate signal lines, and data signal lines. Examples of corresponding driver integrated circuits include, but are not limited to, a touch driver integrated circuit, a gate driver integrated circuit, and a data driver integrated circuit.

Referring to FIG. 3, each of the plurality of conductive lines 2 include a first portion 2A in the first area S1 and a second portion 2B in the second area S2. The second portion 2B is covered by the overcoat layer 3 whereas the first portion 2A is exposed for bonding to a driver integrated circuit (e.g., touch driver integrated circuit). The first portion 2A is configured to be electrically connected to a driver integrated circuit in the first area S1.

Figure 5A:
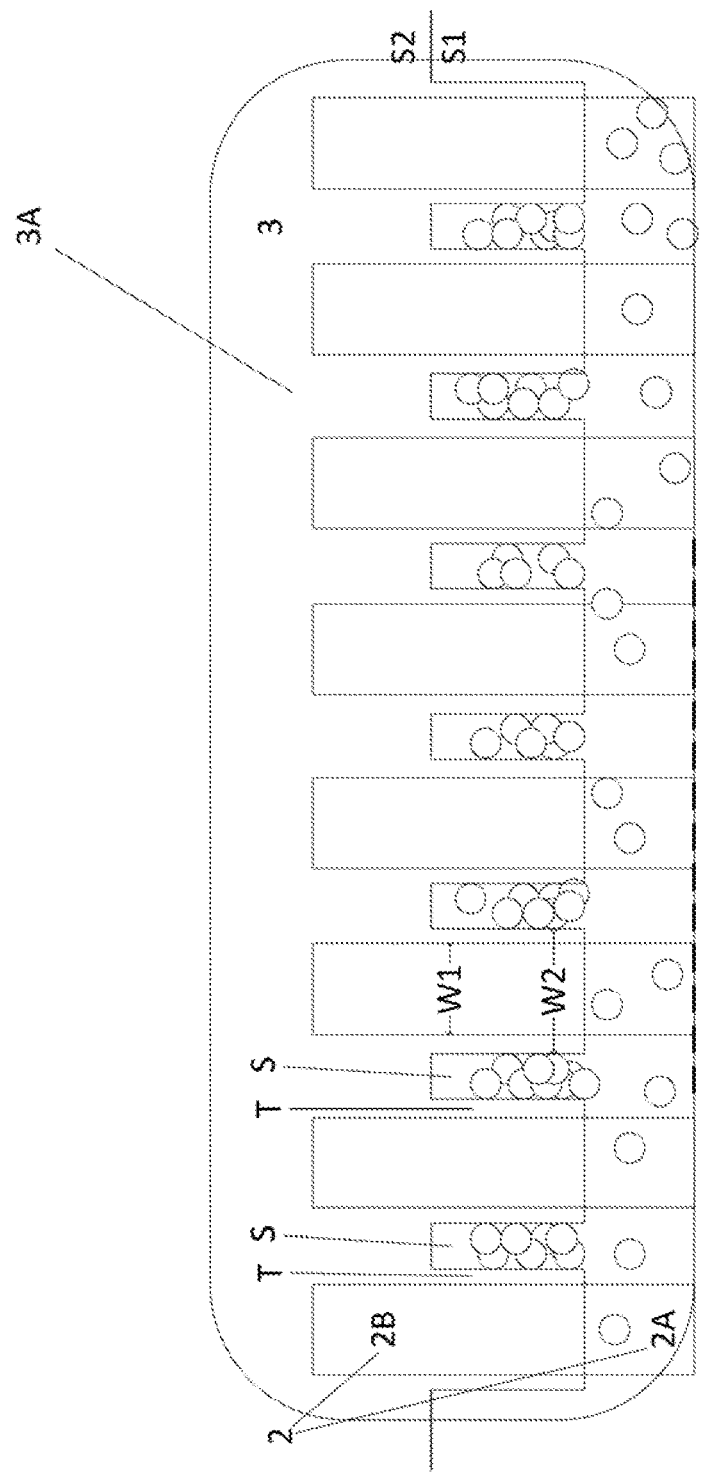
FIG. 5A is a zoom-in view of the dotted circle region in FIG. 3.

Referring to FIG. 3, the overcoat layer 3 includes an interface portion 3A in an area abutting the first area S1. FIG. 5A is a zoom-in view of the dotted circle region in FIG. 3. Referring to FIG. 5A, the interface portion 3A includes a plurality of teeth T and a plurality of slits S, two adjacent teeth T spaced apart by a slit S, two adjacent slits S spaced apart by a tooth T. Optionally, each of the plurality of slits S spaces apart two adjacent teeth T. Optionally, each of the plurality of teeth T spaces apart two adjacent slits S.

Referring to FIG. 5A, a projection of the second portion 2B of each conductive line substantially covered by a projection of a tooth T of the overcoat layer 3 in plan view of the display substrate. Each conductive line 2 (and the second portion 2B thereof) has a first width W1 along a width direction of the conductive line 2, and each tooth T has a second width W2 along the width direction of the conductive line 2. Each tooth T is wider than each conductive line 2. Optionally, the second width W2 is no less than the first width W1. Optionally, the tooth T is wider than the conductive line 2 (and the second portion 2B thereof) on one side of the conductive line 2. Optionally, the tooth is wider than the conductive line 2 (and the second portion 2B) thereof on both sides of the conductive line 2.

Optionally, the first width W1 is in the range of approximately 0.1 μm to approximately 0.3 μm, e.g., approximately 0.1 μm to approximately 0.25 μm. Optionally, the second width W2 is in the range of approximately 0.12 μm to approximately 0.34 μm, e.g., approximately 0.12 μm to approximately 0.14 μm. Optionally, a ratio of the second width to the first width W2/W1 is in the range of 1 to 2, e.g., approximately 1.2 to approximately 1.25.

The tooth and the slit may have any appropriate shape and dimension. For example, the tooth and the slit may have a square or rectangular shape. Optionally, the tooth has a trapezoidal shape and the slit has an inverted trapezoidal shape. Optionally, the tooth has an inverted trapezoidal shape and the slit has a trapezoidal shape. Optionally, the tooth has a trapezoidal shape and the slit has a triangular shape. Optionally, the tooth has an inverted trapezoidal shape and the slit has a triangular shape. Optionally, the tooth has a round shape or an elliptical shape.

Figure 5B:
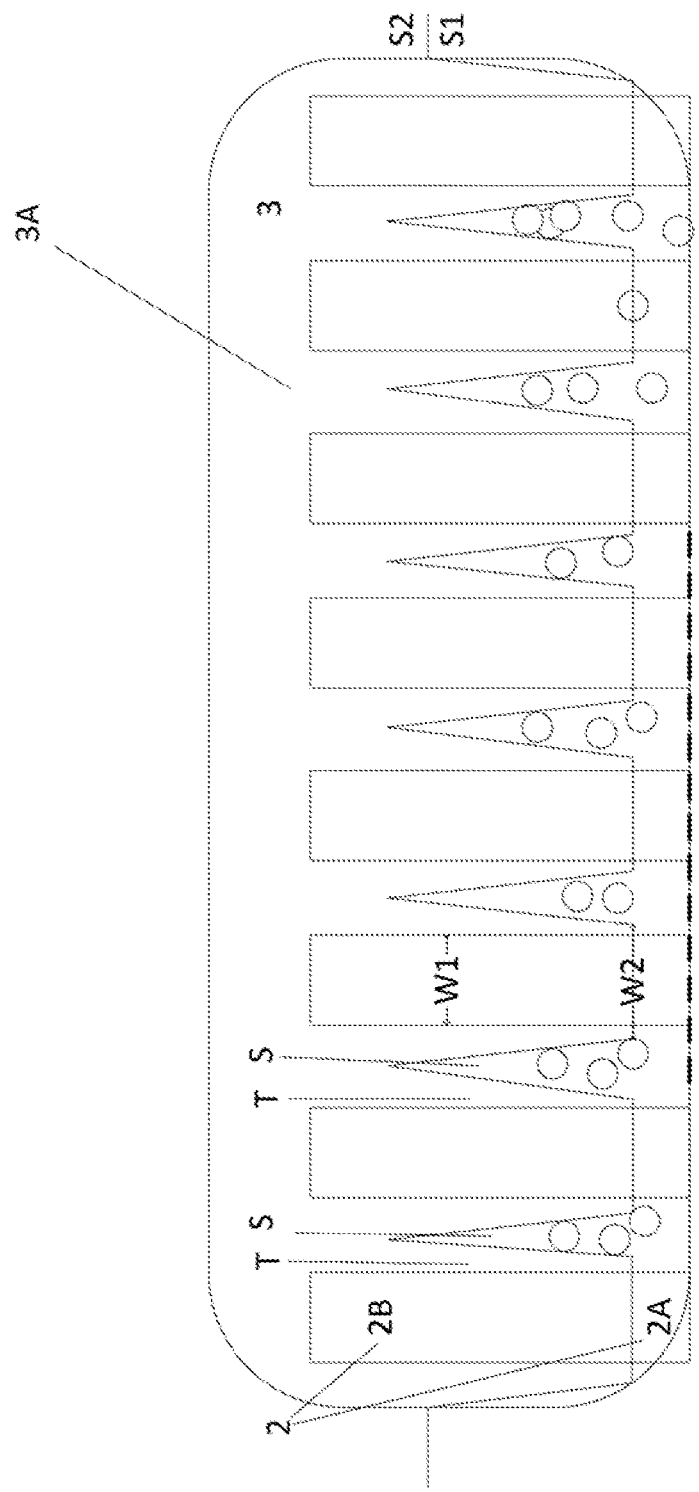
FIG. 5B is a zoom-in view of an interface portion of an overcoat layer in some embodiments.

FIG. 5B is a zoom-in view of an interface portion of an overcoat layer in some embodiments. Referring to FIG. 5B, the tooth T in the interface portion 3A has an inverted trapezoidal shape and the slit S has a triangular shape. As shown in FIG. 5B, each conductive line 2 (and the second portion 2B thereof) has a first width W1 along a width direction of the conductive line 2, and each tooth T has a second width W2 along the width direction of the conductive line 2 at the interface between the first area S and the second area S2. Each tooth T is wider than each conductive line 2 at the interface between the first area S1 and the second area S2. Optionally, the second width W2 is no less than the first width W1. Optionally, the tooth T is wider than the conductive line 2 (and the second portion 2B thereof) on one side of the conductive line at the interface between the first area S1 and the second area S2. Optionally, the tooth is wider than the conductive line (and the second portion 2B thereof) on both sides of the conductive line at the interface between the first area S1 and the second area S2.

In some embodiments, each tooth T has a minimum width W2 along the width direction of the conductive line 2, each conductive line 2 (and the second portion 2B thereof) has a maximum width W1 along the width direction of the conductive line 2. Optionally, the minimum width W2 of the tooth T is no less than the maximum width W1 of the conductive line 2. Optionally, a portion of the tooth T having the minimum width W2 is wider than the conductive line 2 (and the second portion 2B thereof) on one side of the conductive line 2. Optionally, a portion of the tooth T having the minimum width W2 is wider than the conductive line (and the second portion 2B thereof) on both sides of the conductive line 2.

Optionally, the plurality of teeth have a uniform shape, size, and dimension. Optionally, the plurality of slits have a uniform shape, size, and dimension.

Figure 6:
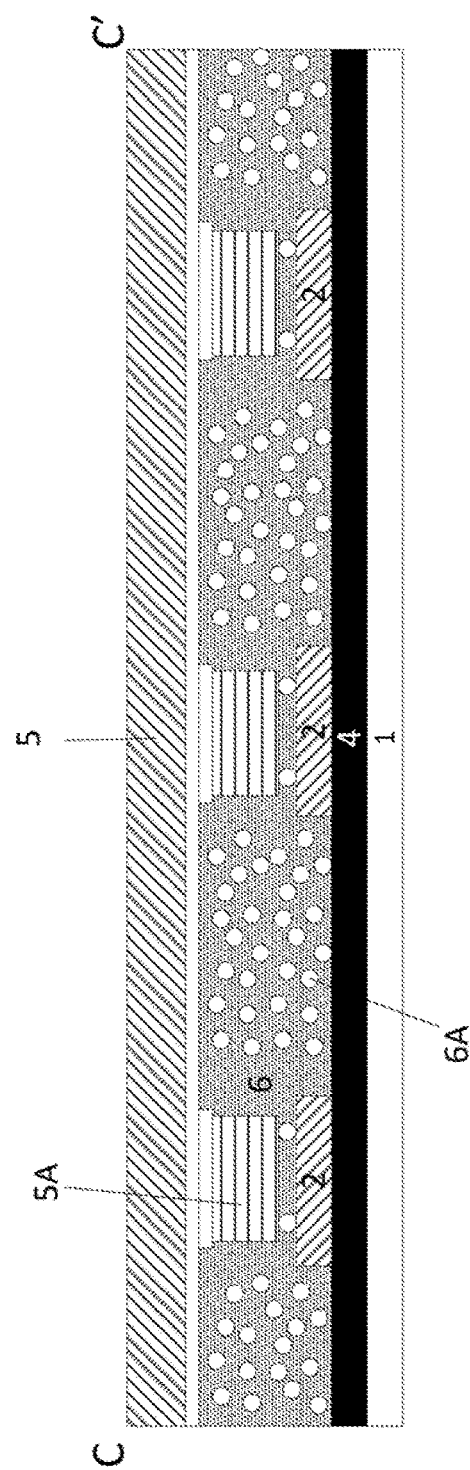
FIG. 6 is a cross-sectional view of a display panel having a display substrate of FIG. 3 along the C-C' line in FIG. 3.

FIG. 6 is a cross-sectional view of a display panel having a display substrate of FIG. 3 along the C-C' line in FIG. 3. Referring to FIG. 6, the display panel in the embodiment includes a driver integrated circuit 5 having a plurality of gold bumps 5A, and an anisotropic conductive film 6 having a plurality of conductive beads 6A, the driver integrated circuit 5 is mounted in the first area S1 by the anisotropic conductive film 6. The conductive beads 6A assure electrical contact between the gold bumps 5A and the conductive lines 2 in the display panel. The anisotropic conductive film 6 is cured to ensure a good electrical connection between the gold bumps 5A and the conductive lines 2.

Figure 7:
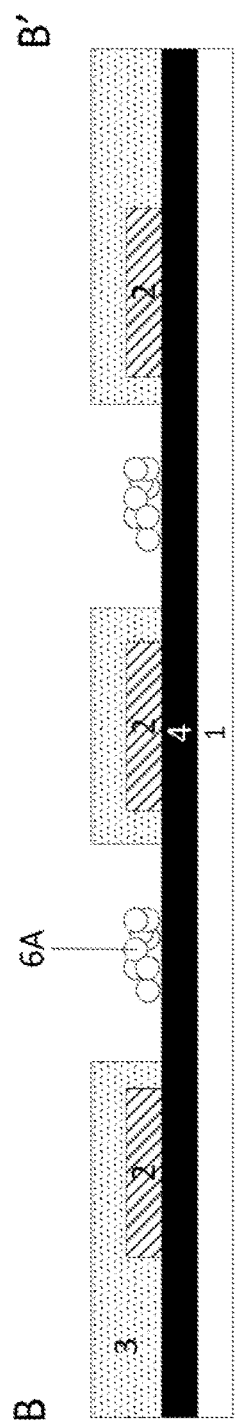
FIG. 7 is a cross-sectional view of a display panel having a display substrate of FIG. 3 along the B-B' line in FIG. 3.

FIG. 7 is a cross-sectional view of a display panel having a display substrate of FIG. 3 along the B-B' line in FIG. 3. As discussed above, the interface portion abutting the first area has a plurality of teeth and a plurality of slits. By having this design, as shown in FIG. 7, the plurality of conductive beads 6A in the anisotropic conductive film 6 is not accumulating in the region between two adjacent conductive lines 2. When the driver integrated circuit is bonded to the first region using the anisotropic conductive film 6, the anisotropic conductive film 6 is pressed, and excess conductive beads 6A at the interface between the first area and the second area are mostly drawn into the slit between adjacent teeth. Thus, short circuit between adjacent conductive lines 2 due to the excess conductive beads 6A in the conventional display panel may be prevented.

Referring to FIG. 4, the display substrate optionally further includes a black matrix layer 4 on a side of the conductive line layer including a plurality of conductive lines 2 proximal to the base substrate 1.

In another aspect, the present disclosure provides a touch panel including a display substrate described herein. For example, the touch panel may include a touch electrode signal line layer having a plurality of touch electrode signal lines, and a touch driver integrated circuit bonded in the first area and connected to the plurality of touch electrode signal lines through the plurality of conductive lines.

In some embodiments, the touch panel includes a touch driver integrated circuit and an anisotropic conductive film having a plurality of conductive beads. The touch driver integrated circuit in the touch panel is mounted in the first area by the anisotropic conductive film. Optionally, the touch panel in the second area includes a touch electrode layer on the base substrate; an insulating layer on a side of the touch electrode layer distal to the base substrate; a touch electrode signal line layer on a side of the insulating layer distal to the touch electrode layer; and the overcoat layer on a side of the touch electrode signal line layer distal to the insulating layer.

The present touch panel may be any appropriate type of touch panel. Optionally, the touch panel is a one-glass-solution touch panel. Optionally, the touch panel is a multi-layer on-cell (MLOC) touch panel. Optionally, the touch panel is a single-layer on-cell (SLOC) touch panel.

Referring to FIG. 6 and FIG. 7, the display panel or the touch panel further includes a black matrix layer 4 on a side of the conductive line layer (including a plurality of conductive lines 2) proximal to the base substrate 1.

In another aspect, the present disclosure provides a display panel including a display substrate described herein. In some embodiments, the display panel includes a driver integrated circuit and an anisotropic conductive film having a plurality of conductive beads. The driver integrated circuit in the display panel is mounted in the first area by the anisotropic conductive film.

Optionally, the display panel further includes a black matrix layer, e.g., on a side of the conductive line layer proximal to the base substrate.

In another aspect, the present disclosure provides a method of fabricating a display substrate having a first area for bonding a driver integrated circuit. In some embodiments, the method includes forming a conductive line layer including a plurality of conductive lines on a base substrate; and forming an overcoat layer on a side of the conductive line layer distal to the base substrate in a second area of the display substrate. According to the present disclosure, the overcoat layer may be formed to have an interface portion in an area abutting the first area. The interface portion has a plurality of teeth and a plurality of slits, two adjacent teeth spaced apart by a slit, two adjacent slits spaced apart by a tooth. Optionally, each of the plurality of slits spaces apart two adjacent teeth. Optionally, each of the plurality of teeth spaces apart two adjacent slits.

Optionally, the plurality of conductive lines are formed to extend from the second area to the first area. Each of the plurality of conductive lines is formed to have a first portion in the first area and a second portion in the second area. A projection of the second portion substantially covered by a projection of a tooth of the overcoat layer in plan view of the display substrate. The first portion is configured to be electrically connected to a driver integrated circuit in the first area.

The overcoat layer may be made of any appropriate material and formed by any appropriate methods, e.g., by chemical vapor deposition (CVD), sputtering, or coating. Optionally, the overcoat layer is formed by coating. Optionally, the overcoat layer is formed by plasma enhanced chemical vapor deposition (PECVD). Optionally, the overcoat layer is made of an organic material such as a resin. Optionally, the overcoat layer is made of silicon nitride ($SiN_x$), silicon oxide ($SiO_x$), or silicon oxynitride ($SiO_xN_y$). Optionally, the overcoat layer is formed by plasma enhanced chemical vapor deposition (PECVD) using a gas containing $SiH_4$ and $N_2O$.

In some embodiments, the overcoat layer having the interface portion is patterned using a mask plate. Optionally, the step of forming the overcoat layer includes forming an overcoat material layer on a side of the conductive line layer; and patterning the overcoat material layer with a mask plate thereby forming the interface portion having the plurality of teeth and the plurality of slits. Any appropriate patterning method may be used to form the overcoat layer. For example, a photoresist layer may be deposited on the base substrate and exposed under the mask plate. The exposed photoresist layer in first area (including areas corresponding to the plurality of slits) is removed whereas the photoresist layer in the second area remains, thereby forming the overcoat layer having an interface portion with the plurality of teeth spaced apart by the plurality of slits. The overcoat material layer in the first area may be removed any appropriate method, e.g., by etching. Optionally, the overcoat material layer is coated onto the base substrate.

In some embodiments, the method further includes forming a signal line layer including a plurality of signal lines in the second area on a side of the overcoat layer proximal to the base substrate. Each of the plurality of conductive lines is electrically connected to a corresponding signal line in the second area. Various appropriate signal lines may be made by the present method. Examples of appropriate signal lines include, but are not limited to, touch electrode signal lines, gate signal lines, and data signal lines. Examples of corresponding driver integrated circuits include, but are not limited to, a touch driver integrated circuit, a gate driver integrated circuit, and a data driver integrated circuit.

The conductive line layer and the signal line layer may be made of any appropriate material and formed by any appropriate methods, e.g., by chemical vapor deposition (CVD), sputtering, or coating. Optionally, the conductive line layer and the signal line layer are made of a single metal or a combination of metals (e.g., as metal alloys or laminates). Optionally, the conductive line layer and the signal line layer include one or more of copper, gold, silver, titanium, chromium, aluminum, or a combination thereof (e.g., as metal alloys or laminates).

In another aspect, the present disclosure provides a method of fabricating a touch panel having a first area for bonding a driver integrated circuit. In some embodiments, the method includes forming a touch electrode layer on a base substrate; forming an insulating layer on a side of the touch electrode layer distal to the base substrate; forming a conductive line layer including a plurality of conductive lines on a side of the insulating layer distal to the touch electrode layer; and forming an overcoat layer on a side of the conductive line layer distal to the insulating layer in a second area of the touch panel. The overcoat layer is formed to have an interface portion in an area abutting the first area. The interface portion has a plurality of teeth and a plurality of slits, two adjacent teeth spaced apart by a slit, two adjacent slits spaced apart by a tooth. Optionally, each of the plurality of slits spaces apart two adjacent teeth. Optionally, each of the plurality of teeth spaces apart two adjacent slits.

Optionally, the plurality of conductive lines are formed to extend from the second area to the first area. Each of the plurality of conductive lines is formed to have a first portion in the first area and a second portion in the second area. A projection of the second portion substantially covered by a projection of a tooth of the overcoat layer in plan view of the touch panel. The first portion is configured to be electrically connected to a touch driver integrated circuit in the first area. Optionally, each tooth is wider than each conductive line. Optionally, the width of each tooth is no less than the width of each conductive line. Optionally, the tooth is wider than the conductive line on one side of the conductive line. Optionally, the tooth is wider than the conductive line on both sides of the conductive line.

In some embodiments, the method further includes forming a touch electrode signal line layer including a plurality of touch electrode signal lines in the second area on a side of the overcoat layer proximal to the base substrate. Each of the plurality of conductive lines is electrically connected to a touch electrode signal line in the second area.

Optionally, the method further includes mounting a touch driver integrated circuit in the first area by an anisotropic conductive film including a plurality of conductive beads. Optionally, the method further includes forming a black matrix layer on a side of the conductive line layer proximal to the base substrate.

Figure 8A:
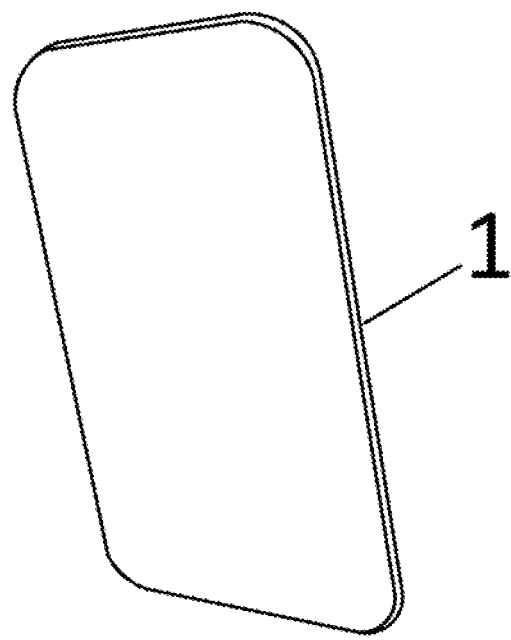
FIGS. 8A-8G are diagrams illustrating a process of fabricating a one-glass-solution touch panel in some embodiments.
Figure 8B:
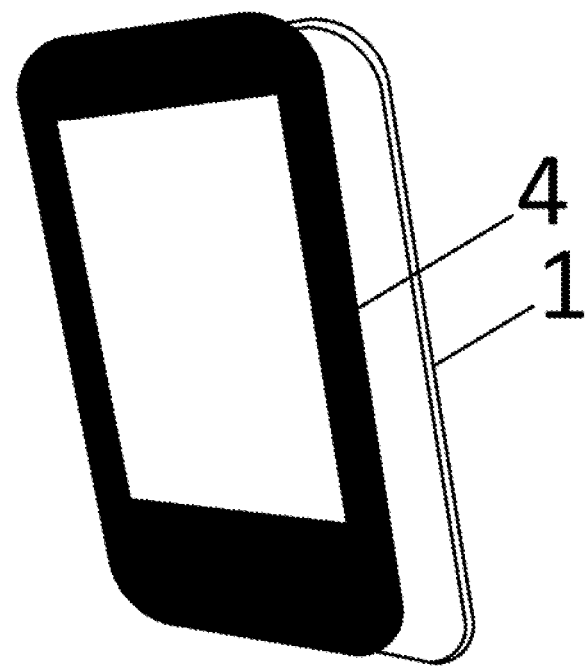
Figure 8C:
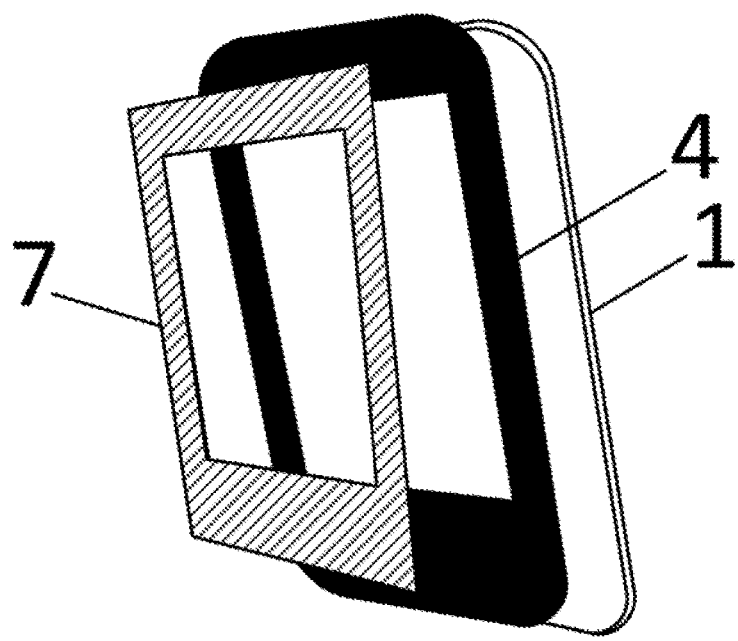
Figure 8D:
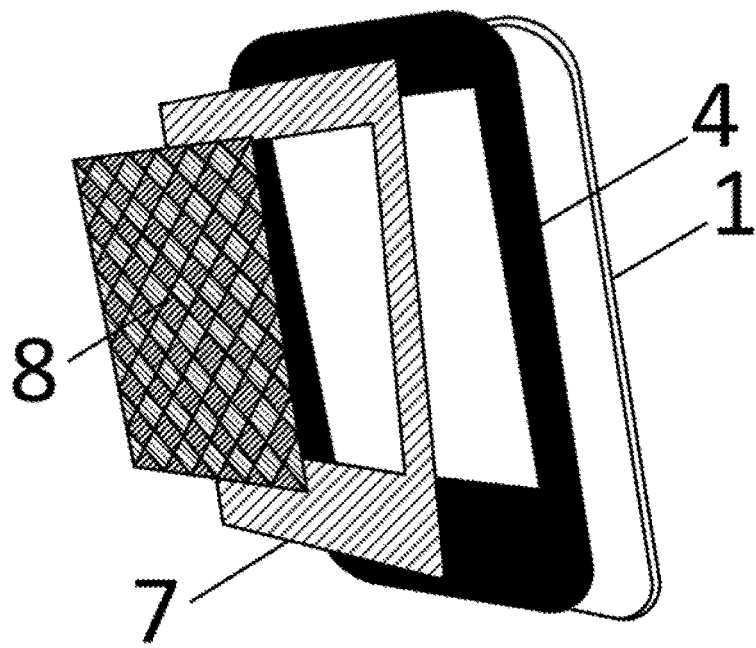
Figure 8E:
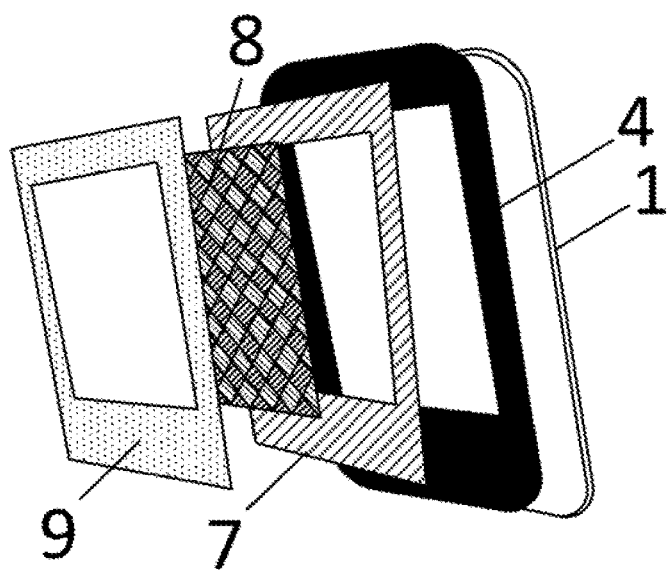
Figure 8F:
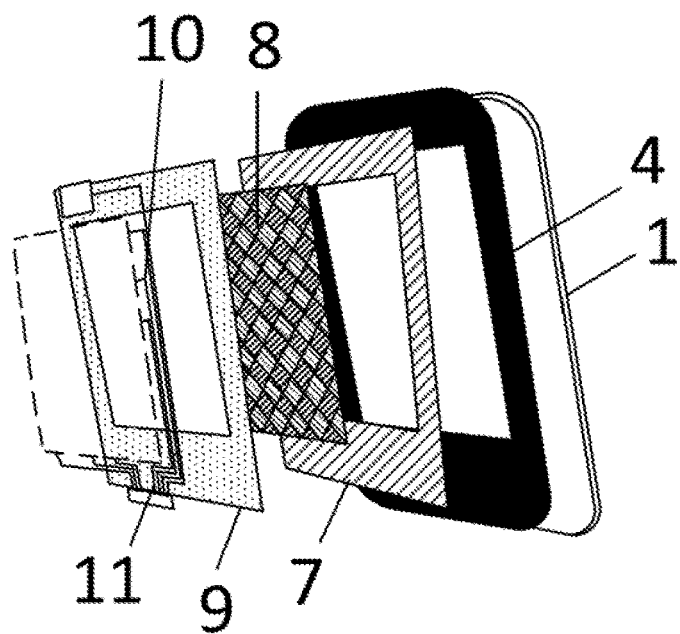

FIGS. 8A to 8G are diagrams illustrating a process of fabricating a one-glass-solution touch panel in some embodiments. In some embodiments, the one-glass-solution touch panel has a first area for bonding a driver integrated circuit and a second area outside of the first area (not explicitly shown in FIGS. 8A to 80). Referring to FIG. 8A and FIG. 8B, a black matrix layer 4 is formed on a base substrate 1. On top of the black matrix layer 4, a first insulating layer 7 is then formed on a side of the black matrix layer 4 distal to the base substrate 1 (FIG. 8C). Subsequently, a touch electrode layer 8 is formed on a side of the first insulating layer 7 distal to the black matrix layer 4 (FIG. 8D). As shown in FIG. 8E, a second insulating layer 9 is formed on a side of the touch electrode layer 8 distal to the first insulating layer 7. In FIG. 8F, a touch electrode signal line layer 10 including a plurality of touch electrode signal lines in the second area and a conductive line layer 11 including a plurality of conductive lines are formed on a side of the second insulating layer 9 distal to the touch electrode layer 8. Each of the plurality of conductive lines is electrically connected to a touch electrode signal line in the second area. The plurality of conductive lines are formed to extend from the second area to the first area. Each of the plurality of conductive lines is formed to have a first portion in the first area and a second portion in the second area.

In some embodiments, the touch electrode signal line layer 10 and the conductive line layer 11 may be formed by a patterning process. For examples, a conductive material layer (e.g., a metal layer or an indium tin oxide layer) may be deposited on a side of the second insulating layer 9 distal to the touch electrode layer 8. Subsequently, a photoresist layer may be deposited on the base substrate and exposed under a mask plate having a pattern corresponding to the touch electrode signal line layer 10 and the conductive line layer 11. The photoresist layer in areas corresponding to the touch electrode signal line layer 10 and the conductive line layer 11 remains, whereas the exposed photoresist layer in the remaining area is removed, thereby forming the touch electrode signal line layer 10 and the conductive line layer 11. The conductive material layer in the remaining area is subsequently removed any appropriate method, e.g., by etching.

Figure 8G:
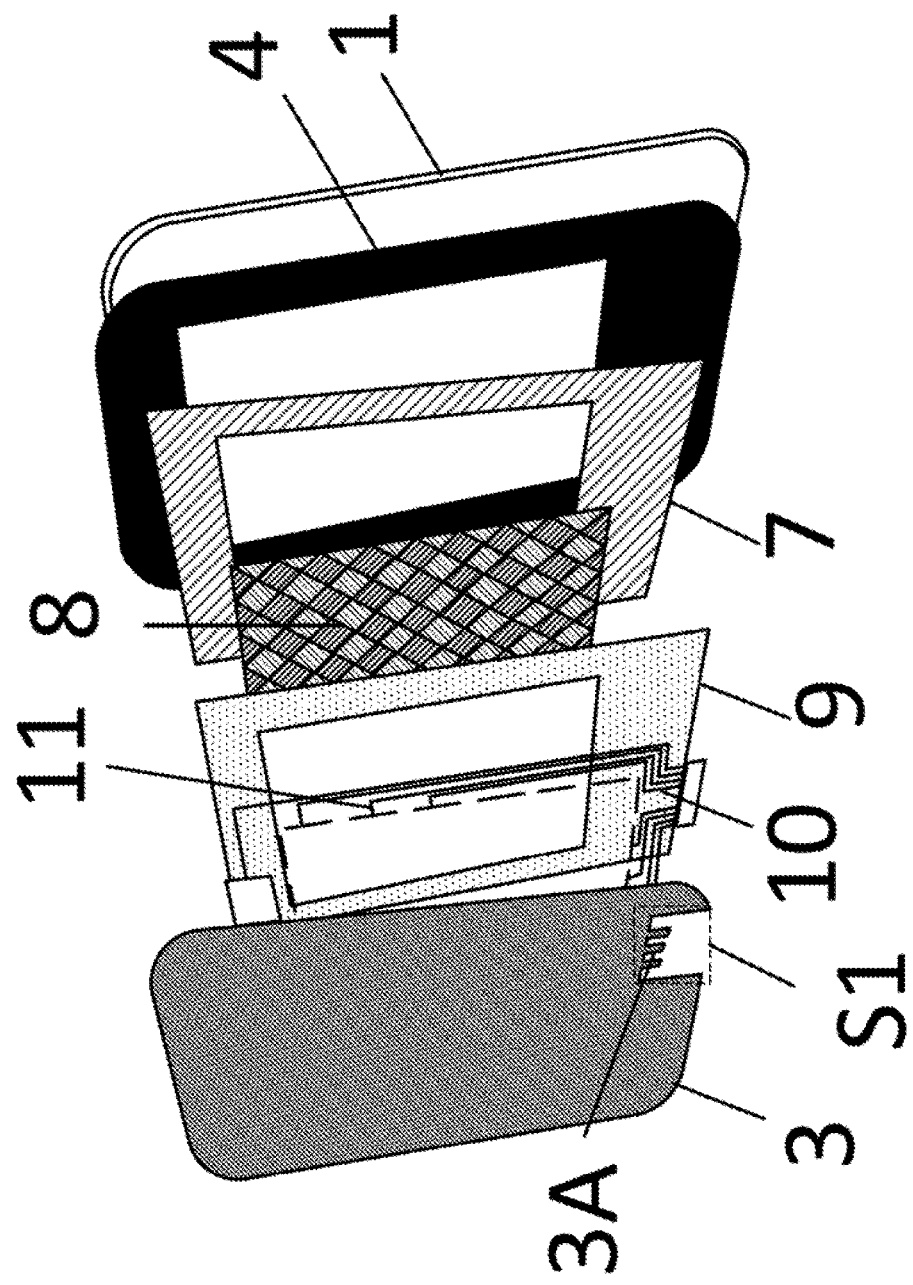

Referring to FIG. 8G, an overcoat layer 3 is then formed in the second area of the touch panel on a side of the touch electrode signal line layer 10 and the conductive line layer 11 distal to the second insulating layer 9. As discussed above, the overcoat layer 3 is formed to have an interface portion 3A in an area abutting the first area S1. The interface portion 3A has a plurality of teeth and a plurality of slits, two adjacent teeth spaced apart by a slit (see, e.g., FIG. 3 and FIG. 5A). Each of the plurality of conductive lines 11 is formed to have a first portion in the first area and a second portion in the second area. A projection of the second portion substantially covered by a projection of a tooth of the overcoat layer 3 in plan view of the display substrate. The first portion is configured to be electrically connected to a touch driver integrated circuit in the first area.

In another aspect, the present disclosure provides a display apparatus having a display substrate described herein or fabricated by a method described herein. In another aspect, the present disclosure provides a display apparatus having a display panel described herein or fabricated by a method described herein. In another aspect, the present disclosure provides a display apparatus having a touch panel described herein or fabricated by a method described herein. Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display substrate having a first area for bonding a driver integrated circuit, comprising:
   a base substrate;
   an overcoat layer on the base substrate in a second area of the display substrate; the overcoat layer comprising an interface portion in an area abutting the first area, the interface portion having a plurality of teeth and a plurality of slits, two adjacent teeth being spaced apart by a slit; and
   a conductive line layer on a side of the overcoat layer proximal to the base substrate, comprising a plurality of conductive lines extending from the second area to the first area; each of the plurality of conductive lines electrically connected to a signal line in the second area; each of the plurality of conductive lines comprising a first portion in the first area and a second portion in the second area; a projection of the second portion substantially covered by a projection of a corresponding tooth in plan view of the display substrate; the first portion being configured to be electrically connected to a driver integrated circuit in the first area.

2. The display substrate of claim 1, wherein a portion of the corresponding tooth having a minimum width is wider than the second portion on both sides of the second portion along a width direction of the second portion.

3. A touch panel comprising, a display substrate of claim 1; wherein the signal line is a touch electrode signal line.

4. The touch panel of claim 3, further comprising:
   a touch driver integrated circuit; and
   an anisotropic conductive film comprising a plurality of conductive beads;
   wherein the touch driver integrated circuit is mounted in the first area by the anisotropic conductive film.

5. The touch panel of claim 3, wherein the touch panel in the second area comprises:
   a touch electrode layer on the base substrate;
   an insulating layer on a side of the touch electrode layer distal to the base substrate;
   a touch electrode signal line layer on a side of the insulating layer distal to the touch electrode layer; and
   the overcoat layer on a side of the touch electrode signal line layer distal to the insulating layer.

6. The touch panel of claim 3, wherein the touch panel is a one-glass-solution touch panel.

7. The touch panel of claim 3, further comprising a black matrix layer on a side of the conductive line layer proximal to the base substrate.

8. A display panel, comprising a display substrate of claim 1.

9. The display panel of claim 8, further comprising:
   the driver integrated circuit; and
   an anisotropic conductive film comprising a plurality of conductive beads;
   wherein the driver integrated circuit is mounted in the first area by the anisotropic conductive film.

10. A display apparatus, comprising a display panel of claim 8.

11. A display apparatus, comprising a touch panel of claim 3.

* * * * *